(12) United States Patent
Kusowski et al.

(10) Patent No.: US 11,066,628 B2
(45) Date of Patent: Jul. 20, 2021

(54) FERMENTED TEA BEER

(71) Applicant: Employee Brewing Company LLC, Columbus, OH (US)

(72) Inventors: Jason Kusowski, Columbus, OH (US); Richard Durham, Columbus, OH (US); Russell Pinto, Columbus, OH (US)

(73) Assignee: Employee Brewing Company LLC, Columbus, OH (US)

( * ) Notice: Subject to any disclaimer, the term of this patent is extended or adjusted under 35 U.S.C. 154(b) by 0 days.

(21) Appl. No.: 15/691,527

(22) Filed: Aug. 30, 2017

(65) Prior Publication Data

US 2018/0057779 A1 Mar. 1, 2018

Related U.S. Application Data

(60) Provisional application No. 62/381,845, filed on Aug. 31, 2016.

(51) Int. Cl.
*C12C 5/02* (2006.01)
*A23F 3/16* (2006.01)

(52) U.S. Cl.
CPC .............. *C12C 5/026* (2013.01); *A23F 3/166* (2013.01)

(58) Field of Classification Search
CPC ......... A23L 2/382; A23F 3/166; C12G 3/025; C12G 3/02
USPC .................................... 426/11, 15, 590, 592
See application file for complete search history.

(56) References Cited

U.S. PATENT DOCUMENTS

| | | | |
|---|---|---|---|
| 5,618,572 A | | 4/1997 | Tripp et al. |
| 2006/0018995 A1 | | 1/2006 | Smith |
| 2007/0231428 A1 | | 10/2007 | Mensour et al. |

FOREIGN PATENT DOCUMENTS

| | | | | |
|---|---|---|---|---|
| CN | 101263853 A | * | 9/2008 | |
| CN | 101348755 A | * | 1/2009 | |
| CN | 101724526 A | * | 6/2010 | |
| CN | 102978067 A | * | 3/2013 | |
| CN | 103409282 A | * | 11/2013 | |
| CN | 103409282 B | * | 1/2015 | |
| FR | 2943354 A1 | * | 9/2010 | |

* cited by examiner

*Primary Examiner* — Vera Stulii
(74) *Attorney, Agent, or Firm* — Porter Wright, Morris & Arthur, LLP

(57) ABSTRACT

A gluten-free fermented beverage for human consumption includes a mixture including tea and alcohol. The alcohol is formed by a single culture yeast and fermentable sugar not derived from grain. A method for making the beverage includes steeping a form of tea leaves in water to form a tea, adding a form of yeast nutrient to the tea, adding a fermentable sugar not derived from grain to the tea, adding a single culture yeast to the tea, fermenting the tea mixture, adding citric acid before and/or after the step of fermenting, filtering the fermented tea, and carbonating the fermented tea.

10 Claims, 2 Drawing Sheets

FERMENTED TEA BEER

CROSS-REFERENCE TO RELATED APPLICATIONS

This application claims the priority benefit of U.S. Provisional Patent Application No. 62/381,845 filed on Aug. 30, 2016, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to fermented beverages and methods of producing fermented beverages by fermenting sugars and yeast to produce alcohol. More specifically the field of invention relates to gluten-free fermented beverages and methods for producing fermented beverages without using grain, malt, sorghum, and/or other cereal starches.

BACKGROUND OF THE INVENTION

A popular fermented beverage is beer. Beers are produced by fermenting grain, malt, sorghum and/or other cereal starches which are broken down to produce a wort with fermentable sugars. Beer or brewers yeast then acts on the fermentable sugars to produce alcohol. Because the fermentable sugars and flavors are each at least in part derived from grains, the resulting beers contain gluten.

All tea, whether it's black, oolong, green, white, or pu-erh, comes from the *Camellia sinensis* plant. Tea hot or cold can be brewed by either steeping it in water or by adding water to the tea. White tea extracts have been added to some beers to improve the flavor of the beers. However, because the fermentable sugars and flavors are each at least in part derived from grains, the resulting tea-flavored beers contain gluten.

Fruit flavored beers have been made by adding fruits whole or in juice form to produce a wort made with grain, malt, sorghum, and/or other cereal starches. The beer or brewers yeast then acts on the fermentable sugars breaking it down to produce alcohol. Because the fermentable sugars and flavors are each at least in part derived from grains, the resulting fruit-flavored beers contain gluten.

Coffee has been used in stouts and porters to produce coffee beers. Coffee beers are produced by adding coffee beans to the wort made with grain, malt, sorghum, and/or other cereal starches. The beer or brewers yeast acts on the fermentable sugars to produce a coffee aroma and/or coffee flavored beer. Because the fermentable sugars and flavors are each at least in part derived from grains, the resulting coffee beers contain gluten.

Many people experience digestive and health problems caused by eating or drinking gluten or wheat. There are at least three different medical conditions that could explain intolerance to gluten and/or wheat: celiac disease, wheat allergy, or non-celiac gluten sensitivity (NCGS). Gluten is a protein in wheat, barley, and rye etc. Wheat is a grain used as an ingredient in breads, pastas, and cereal etc. Barley is commonly found in beer and in foods and drinks containing malt. Rye is most often found in rye bread, rye beer, and some cereals. The typical treatment for celiac disease is adhering to a strict gluten-free diet. The typical treatment for a wheat allergy is to adhere to a strict wheat-free diet. If you have NCGS, the extent to which you need to eliminate gluten from your lifestyle depends on the severity of your symptoms and your own tolerance level. As a result many people cannot enjoy fermented beverages such as beer. Accordingly, there exists a need for gluten-free fermented beverages such as beer and methods for producing fermented beverages such as beer without using grain, malt, sorghum, and/or other cereal starches.

SUMMARY OF THE INVENTION

The present invention provides fermented beverages and methods for producing fermented beverages which address at least one of the above-noted problems of the prior art. Disclosed herein is a fermented beverage for human consumption comprising, in combination, a mixture including tea and alcohol. The alcohol is formed by a single culture yeast and fermentable sugar not derived from grain. The mixture is gluten free.

Also disclosed herein is a method for making a fermented beverage for human consumption. The method comprises the steps of, in combination, steeping a form of tea leaves in water to form a tea, adding a form of yeast nutrient to the tea, adding a fermentable sugar not derived from grain to the tea, adding a single culture yeast to the tea, fermenting the tea after the yeast nutrient, the fermentable sugar, and the single culture yeast have been added to form fermented tea, adding citric acid before and/or after the step of fermenting, filtering the fermented tea, and carbonating the fermented tea.

Also disclosed herein is a gluten-free fermented beverage made by a method comprising the steps of, in combination, steeping a form of tea leaves in water to form a tea, adding a form of yeast nutrient to the tea, adding a fermentable sugar not derived from grain to the tea, adding a single culture yeast to the tea, fermenting the tea after the yeast nutrient, the fermentable sugar, and the single culture yeast have been added to form fermented tea, adding citric acid before and/or after the step of fermenting, filtering the fermented tea, and carbonating the fermented tea.

From the foregoing disclosure and the following more detailed description of various preferred embodiments it will be apparent to those skilled in the art that the present invention provides a significant advance in the technology and art of fermented beverages and methods of producing fermented beverages. Particularly, significant in this regard is the potential the invention affords for providing a good tasting and effective gluten-free fermented beverage. Additional features and advantages of the invention will be better understood in view of the detailed description provided below.

BRIEF DESCRIPTION OF THE DRAWINGS

These and further objects of the invention will become apparent from the following detailed description.

Figure 1:
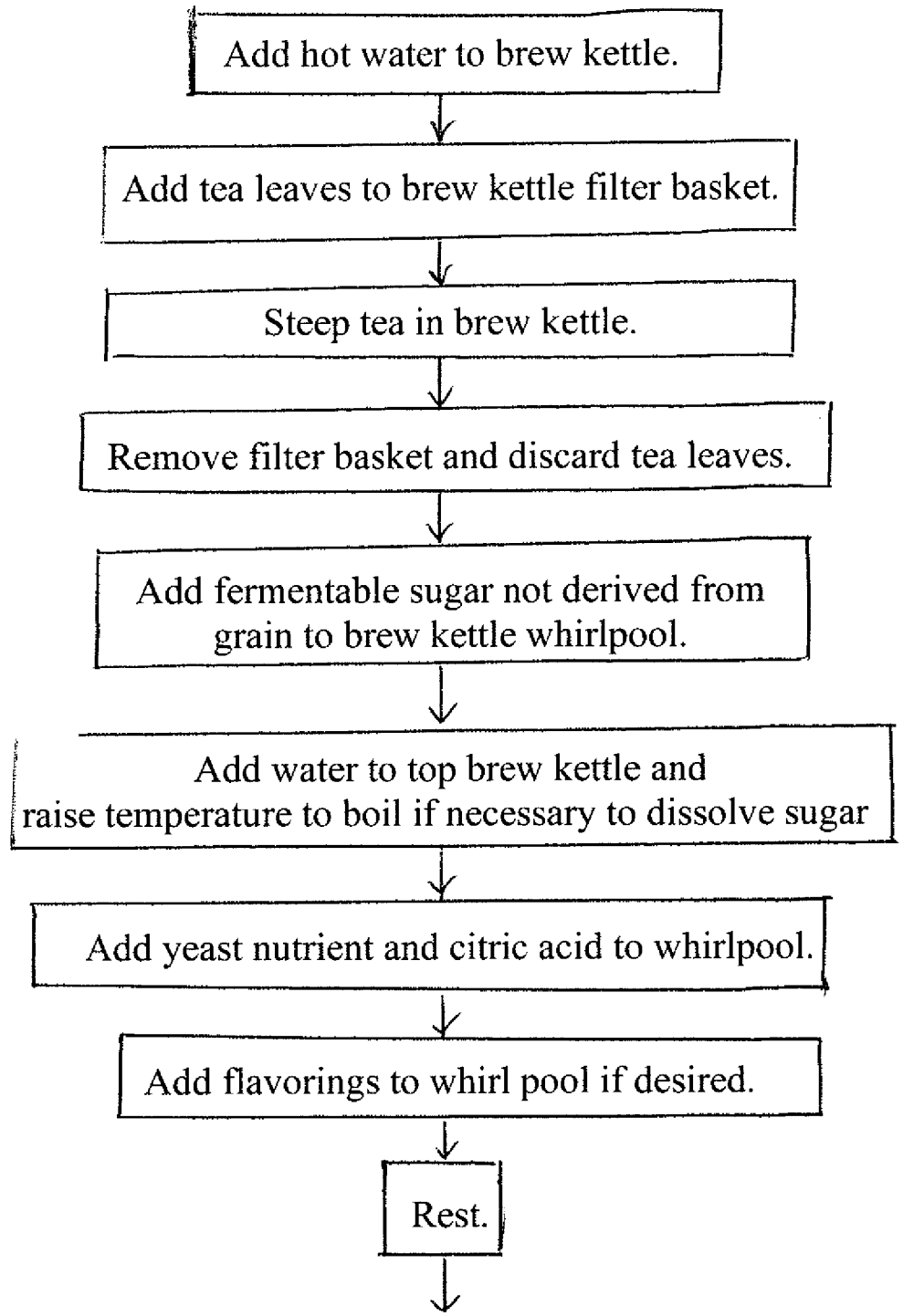
FIG. 1 is a schematic view of a first or hot portion of a method for making a fermented beverage according to the present invention.

DETAILED DESCRIPTION OF CERTAIN
PREFERRED EMBODIMENTS

It will be apparent to those skilled in the art, that is, to those who have knowledge or experience in this area of technology, that many uses and design variations are possible for the fermented beverages and methods of making fermented beverages disclosed herein. The following detailed discussion of various alternative and preferred embodiments will illustrate the general principles of the invention with regard to the specific disclosed embodiments. Other embodiments suitable for other applications will be apparent to those skilled in the art given the benefit of this disclosure.

A fermented beverage in the form of a tea-based beer for human consumption according to the present invention comprises a mixture including at least one form of tea and alcohol is gluten free. The term "gluten free" is used to mean no more than 20 parts per million of gluten. The alcohol is formed by a single culture yeast and fermentable sugar not derived from grain, malt, sorghum or other cereal starches.

The principal ingredients in the tea-based beer include, but not limited to: (1) green, black and/or oolong tea, (2) jam, jelly, fruit juice, and/or fruit, (3) citric acid, (4) a form of sweetener (organic, evaporated, or plain), (5) any suitable form of yeast, (6) yeast nutrient, and (7) additional flavorings. The quantities of each ingredient can range in the following quantities for a single batch. For larger batches, the quantities are adjusted accordingly.

The tea can be any suitable tea. Tea is obtained with cured leaves of the *Camellia sinensis* and soaked in warm or hot water. The tea leaves can be of any suitable type but are preferably green, black and/or oolong tea leaves. The green, black, and/or oolong tea leaves can be of any suitable type such as for example loose, powder, and the like. The quantity of green, black and/or oolong tea can range from about 50 grams to about several pounds depending on the batch size. The quantities can be adjusted as the batch size varies. The quantity of green, black and/or oolong tea can alternatively be less or more than this range depending on the caffeine content desired.

The fermented beverage can also include jam, jelly, fruit juice, and/or fruit. The jam, jelly, fruit juice, and/or fruit can be of any suitable type. The type of jam, jelly, fruit juice, and/or fruit utilized depends on the flavoring desired. The quantity of jam, jelly, fruit juice, and/or fruit can be in the range of about 100 ounces to about several gallons depending on the amount of flavor desired and the batch size.

The citric acid is added to obtain desired pH value of the fermented beverage. The pH value of the premixed concentrate can be in the range of about 2.6 to about 4.0. Accordingly, a suitable quantity of citric acid is added to obtain the desired pH for the tea-based beer.

The sweetener is a fermentable sugar. The fermentable sugar can be of any suitable type including, but not limited to, raw sugar, cane sugar, Stevia, organic sugar, honey, and the like. Preferably the sweetener is cane sugar but any other suitable type can be utilized. The quantity of sweetener added to the mixture depends on the desired brix level for the start of the batch. The brix level of the premixed concentrate can typically range from about 45 to about 60.

The yeast is a single culture yeast for fermentation so that single culture fermentation is obtained rather than wild fermentation which occurs when multiple yeasts and bacteria are provided. Thus, the yeast is a bacteria free yeast. The single culture yeast or "pure culture yeast" is preferably a beer or brewers yeast. Brewers yeast is the Saccharomyces cerevisiae species of yeast. The quantity of yeast added depends on the amount of fermentation desired. The quantity of yeast added can be in the range of about 0.5 ounces to about several kilos or pounds depending on the yeast strain and the fermentation desired.

The yeast nutrient can be of any suitable type that nourishes the yeast, ensuring that it remains healthy throughout fermentation. The yeast nutrient can be a mixture of diammonium phosphate and food-grade urea etc.

The additional flavoring which can be of any suitable type. The flavoring can be added if desired to improve the taste. The amount of flavoring added can vary from about 1 ounce to several gallons depending on the batch size. The flavoring can be eliminated from the tea-based beer if desired. The additional flavoring can be fruit based. Alternatively and/or additionally, the additional flavoring can be of any other suitable type such as, for example, hops can be added to give the beer a hop taste.

Figure 2:
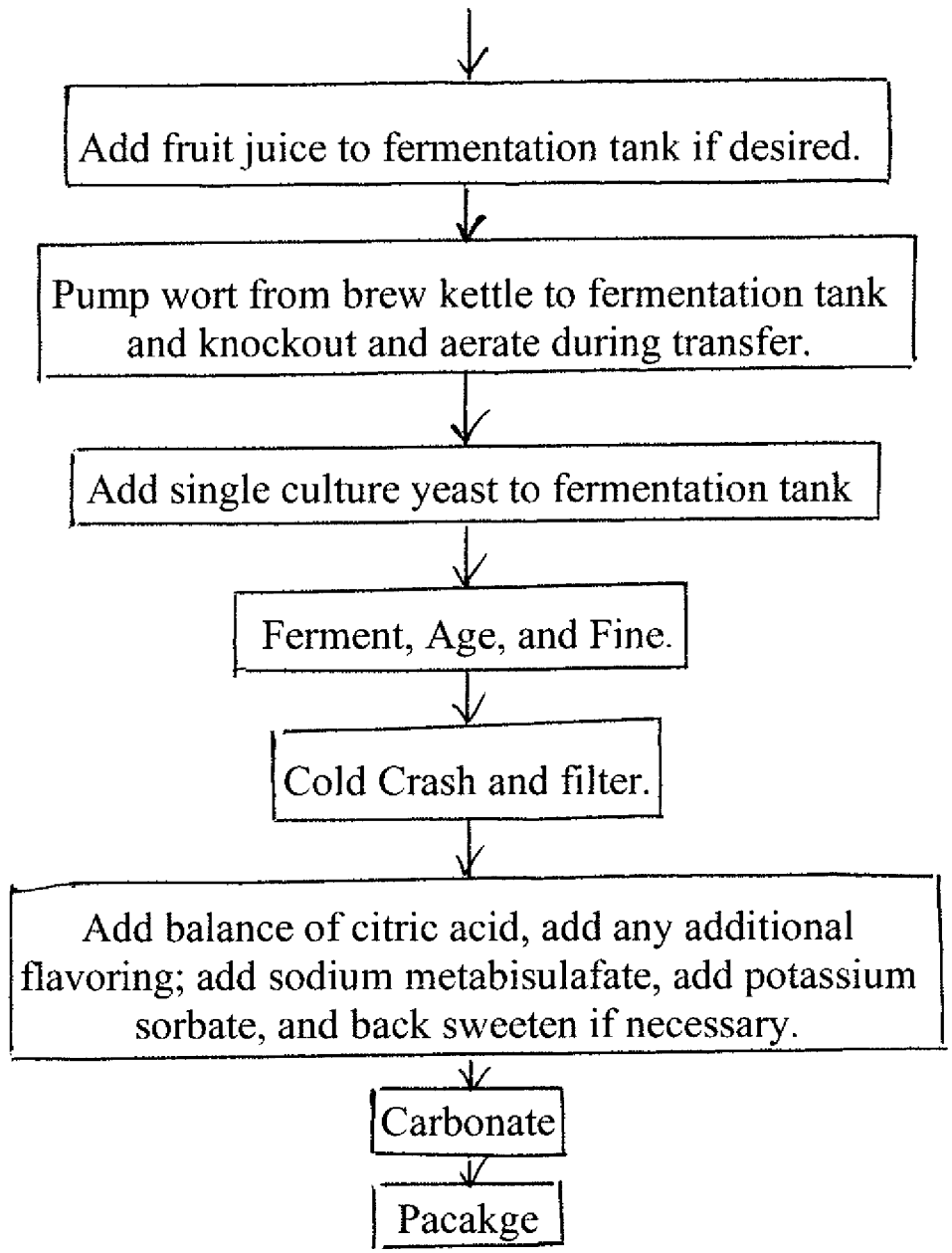
FIG. 2 is a schematic view of a second or cold portion of the method for making a fermented beverage of FIG. 1.

As shown in FIGS. 1 and 2, a method for making a fermented beverage according to an embodiment of the invention includes the steps of: (1) steeping a form of tea leaves in water to form a tea; (2) adding a fermentable sugar not derived from grain to the tea; (3) adding a form of yeast nutrient to the tea; (4) adding citric acid before and/or after the step fermenting; (5) adding a single culture yeast to the tea; (6) fermenting the tea after the yeast nutrient, the fermentable sugar, and the single culture yeast have been added to form fermented tea; (7) filtering the fermented tea; and (8) carbonating the fermented tea. This end product is similar to a beer which is ready for human consumption.

The step of steeping the tea leaves in water to form a tea preferably includes adding hot water to a brew kettle and then adding the tea leaves to a filter basket within the kettle so that the teas is steeped in the kettle. The temperature of the water can be any suitable temperature for extracting flavors and nutrients from the tea leaves. The water temperature is preferably below 189 degrees F. and is more preferably in the range of 170 degrees F. to 189 degrees F. The tea leaves are preferable in loose form but can alternatively have any other suitable form such as, for example, powder. Once the tea is suitably steeped, the filter basket is removed from the kettle and the used tea leaves are discarded.

The step of adding a fermentable sugar not derived from grain to the tea, preferably includes adding the sugar to the hot tea mixture so that the sugar is dissolved in the tea mixture. The sugar is preferably added to a whirlpool to assist incorporation. A whirlpool is a circular current in the mixture within the brew kettle which can be created using various known techniques and equipment. Additional water can be added to the kettle to top off the brew kettle if desired and the temperature of the mixture can be raised to a boil if necessary to completely dissolve the sugar.

The step of adding a form of yeast nutrient to the tea mixture includes adding the yeast nutrient to the whirlpool within the brew kettle so that the yeast nutrient is incorporated into the mixture. The step of adding citric acid to the tea mixture includes adding the citric acid to the whirlpool within the brew kettle so that the citric acid is incorporated into the mixture to obtain a desired pH. Note that the citric acid can be before and/or after the step fermenting. If desired, fruit can also be added to the whirlpool at this time. The fruit can include, but are not limited to, artificial fruit in liquid form or natural fruit in the form of jelly, jam, fruit juice and/or fruit. Any other desired flavoring can also be added at this time to the whirlpool such as, for example, hops or the like. The specific gravity (density) of the tea mixture is checked to determine the amount of sugar in the mixture. The specific gravity of the tea mixture can then be adjusted to a predetermined calculated amount in desired. The tea mixture is then preferably allowed to rest for a suitable period of time.

Fruit juice is then preferably poured into a fermentation tank. The fruit juice can be any suitable juice to provide a desired flavor. It is noted that the fruit juice can be eliminated if desired. Next the tea mixture is pumped from the brew kettle to the fermentation tank. Note that if desired, the tea mixture can alternatively be pumped to the fermentation tank prior to adding the fruit juice if desired. Preferably, the tea mixture is knocked out and aerated during the transfer from the brew kettle to the fermentation tank. The knockout step flash cools the wort or unfermented tea mixture to stop preparation of the wort. Typically the flash cooling occurs with a liquid/liquid heat exchanger with ice cold water used and the heat exchange medium but any other suitable method can be alternatively utilized. The aeration step adds oxygen to the wort to promote yeast health during fermentation. Note that the process used is a closed process to the wort and resulting fermented beverage will not otherwise be exposed to atmosphere for the remainder of the process.

Once the wort is in the fermentation tank the single culture yeast is added to the wort and the wort is permitted to ferment within the fermentation tank. During the fermentation stage, the pH and density (specific gravity) is monitored. Fermentation ends when the yeast stops eating the sugar. At the end of primary fermentation, a diacetyl rest can be performed if desired wherein the temperature of the beer is increased (or held if already suitably warm) for a predetermined period of time to allow the yeast to remove some very specific undesirable flavors. Next the beer is aged wherein the yeast remains in contact with the beer within the fermentation tank to "round out" the flavors of fermentation. The aging step is typically about an additional week. Preferably, the next step is a fining step wherein silica zerogel is added to speed the process of yeast and fruit solids dropping to the bottom of the fermentation tank. This aids in the later filtration step by removing large amounts of solids including yeast and plant material.

Next the beer is preferably cold crashed. Cold crashing is the process of rapidly dropping the temperature to have yeast proteins and other solids fall out of solution. The step of cold crashing can be eliminated if desired. The beer is then filtered. The filtration is preferably a nominal 3 micron filtration to obtain a clear product but any other suitable filtration can alternatively be utilized.

After filtration, the balance of any citric acid is added to obtain a desired final pH. Also any additional flavorings are added to obtain a desired flavor and/or aroma for the beer. The beer can also be back sweetened if desired by adding additional sweetener in the form of sugar to obtain a desired taste for the beer.

Next the beer is carbonated. The beer is preferably carbonated by bubbling CO2 through the beer in a known manner. The carbonation is preferably in the range of 2.5 to 2.7 volumes and is more preferably about 2.6 volumes. The beer can be carbonated by putting it in to bright tanks with carbonation stones. When the carbonation levels reaches a predetermined level, the beer is considered carbonated and ready for packaging. Alternatively instead of a bright tank, the fermented beverage can be back sweetened with a suitable sweetener and be bottle conditioned or force carbonated in kegs to attain desired levels of carbonation. Note that the beer of the disclosed embodiment is not microfiltered and is not pasteurized. The fermented beverage can also be stored in barrels for a certain period of time to obtain a barrel aged flavoring to the finished product if desired.

Finally the beer is packaged in any suitable packaging such as, for example, in bottles, cans, draft kegs, growlers, mason jars, and the like. The packaged beer can be stored warm or cold from manufacturing to distribution, and to a consumer. The fermented beverage is best enjoyed cold. The draft kegs should be chilled before tapping the keg.

EXAMPLE

A gluten-free black cherry bourbon flavored tea beer according to the invention was prepared in accordance to the following:

steep 0.7 pounds/BBL of Loose China Black Tea leaves and 0.7 pounds/BBL of Gunpowder Green Tea leaves in water within a brew kettle at or below 175 degrees F. for 15 minutes and remove tea leaves;

add cane sugar in the amount of about 98.8% of fermentables to the whirlpool, add water to top brew kettle, and boil sugar solution for 15 minutes if necessary;

add 0.22 pounds/BBL of yeast nutrient to whirlpool;

add 0.283 pounds/BBL of citric acid to whirlpool;

rest for 15 minutes;

add Dark Sweet Cherry Juice in the amount of about 1.2% of fermentables to a clean, sanitized fermentation vessel;

transfer the wort from the brew kettle to the fermentation vessel and during transfer knock out to 72 degrees F. and aerate 10-12 ppm oxygen, target gravity at KO is 14.0 P;

pitch a brewers yeast to the fermentation vessel at 30.0× $10^6$ cells per ml;

ferment at 75 degrees F. for approximately 7 to 9 days;

diacetyl rest at 75 degrees F. for about 3 days until clear;

age for minimum of 7 days;

cold crash at specific gravity of 4.5 P;

filter the fermented tea;

add balance of citric acid as needed, add 0.4 oz/BBL of Black Cherry Flavoring, add 0.4 oz/BBL of bourbon Flavoring; add ¼ tsp/6 gallons of Sodium Metabisulphate, and add ½ tsp/gallon of Potassium Sorbate;

carbonating the beer to a target of 2.6 volumes CO2; and target volume is 30.25 BBL with an ABV of 5.46%.

It is noted that each of the features of the various disclosed embodiments of the present invention can be utilized in any combination with each of the other disclosed embodiments of the present invention.

From the above disclosure it can be appreciated that gluten-free beverage or beer can be provided.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A method for making a gluten-free and tea based fermented beverage for human consumption, the method comprising the steps of, in combination:
   steeping a form of tea leaves in water within a brewing kettle to form a tea;
   wherein the tea leaves include a mixture of black tea leaves and green tea leaves;
   removing the tea leaves from the brew kettle;
   adding a form of yeast nutrient to the tea within the brewing kettle;
   adding a fermentable sugar not derived from grain to the tea within the brewing kettle;
   dissolving the fermentable sugar within the brewing kettle;
   resting an unfermented mixture of the tea, the yeast nutrient, and the dissolved sugar, within the brewing kettle;
   transferring the unfermented mixture from the brewing kettle to a closed fermentation tank where contents are not exposed to atmosphere;
   knocking out the unfermented mixture by flash cooling the unfermented mixture to stop preparation of the unfermented mixture during transfer from the brewing kettle to the fermentation tank and aerating the unfermented mixture to add oxygen to the unfermented mixture during transfer from the brewing kettle to the fermentation tank;
   wherein the unfermented mixture is flash cooled by passing the unfermented mixture through a heat exchanger during transfer from the brewing kettle to the fermentation tank;
   adding a single culture brewers yeast to the unfermented mixture within the fermentation tank;
   fermenting the unfermented mixture after the single culture brewers yeast is added to form fermented tea within the fermentation tank;
   adding at least one of fruit puree, fruit jam, fruit jelly, and fruit juice to the fermentation tank prior to the step of fermenting;
   aging the fermented tea within the fermentation tank when fermentation stops;
   adding citric acid to the tea within the brewing kettle before the step of transferring the unfermented mixture from the brewing kettle to the fermentation tank and/or to the fermented tea within the fermentation tank after the step of fermenting;
   filtering the fermented tea after the step of aging the fermented tea;
   after filtering the fermented tea, adding stabilizers to the fermented tea to inhibit further fermentation;
   after filtering the fermented tea, back sweetening the fermented tea by adding additional sweetener not derived from grain to the fermented tea; and
   carbonating the fermented tea after the step of filtering the fermented tea.

2. The method for making a gluten-free and tea based fermented beverage according to claim 1, wherein the step of adding at least one of fruit puree, fruit jam, fruit jelly, and fruit juice to the fermentation tank is performed prior to transferring the unfermented mixture from the brewing kettle to the fermentation tank.

3. The method for making a gluten-free and tea based fermented beverage according to claim 1, wherein tea is steeped with at least one of green tea, black tea, and oolong.

4. The method for making a gluten-free and tea based fermented beverage according to claim 1, wherein the tea-based fermented beverage is unpasteurized.

5. The method for making a gluten-free and tea based fermented beverage according to claim 1, further comprising the step of a diacetyl rest wherein the temperature of the fermented tea is raised within the fermentation tank after the step of fermenting and before the step of aging.

6. The method for making a gluten-free and tea based fermented beverage according to claim 1, further comprising cold crashing the fermented tea before the step of filtering the fermented tea.

7. The method for making a gluten-free and tea based fermented beverage according to claim 1, wherein the aging step is at least 7 days.

8. The method for making a gluten-free and tea based fermented beverage according to claim 1, wherein the heat exchanger is a liquid-to-liquid heat exchanger.

9. The method for making a gluten-free and tea based fermented beverage according to claim 1, wherein the stabilizers include sodium metabisulfate and potassium sorbate.

10. The method for making a gluten-free and tea based fermented beverage according to claim 1, wherein all alcohol in the gluten-free and tea based fermented beverage is produced by the step of fermenting.

* * * * *